(12) United States Patent
Esmiller et al.

(10) Patent No.: US 7,736,813 B2
(45) Date of Patent: Jun. 15, 2010

(54) ELECTROCHEMICAL CELL WITH EMISSION CONTROLLED BY ELECTRODEPOSITION OF COPPER

(75) Inventors: Bruno Esmiller, Villennes sur Siene (FR); Lionel Beluze, Rennes (FR); Jean-Claude Badot, Paris (FR); Bruno Viana, Montgeron (FR); Jean-Marie Tarascon, Mennecy (FR)

(73) Assignee: European Aeronautic Defence and Space Company – EADS France, Paris (FR)

( * ) Notice: Subject to any disclaimer, the term of this patent is extended or adjusted under 35 U.S.C. 154(b) by 531 days.

(21) Appl. No.: 11/793,865

(22) PCT Filed: Dec. 19, 2005

(86) PCT No.: PCT/FR2005/051104
§ 371 (c)(1),
(2), (4) Date: Jun. 21, 2007

(87) PCT Pub. No.: WO2006/067352
PCT Pub. Date: Jun. 29, 2006

(65) Prior Publication Data
US 2008/0153007 A1    Jun. 26, 2008

(30) Foreign Application Priority Data
Dec. 21, 2004  (FR) .................................. 04 53112

(51) Int. Cl.
*H01M 6/02*  (2006.01)
*H01M 4/58*  (2006.01)
(52) U.S. Cl. .................... 429/345; 429/231.8; 359/265; 359/267; 359/269; 359/275
(58) Field of Classification Search ................. 359/265, 359/267, 269, 275
See application file for complete search history.

(56) References Cited

OTHER PUBLICATIONS

Bessiere A et al.: "Flexible electrochromic reflectance device based on tungsten oxide for infrared emissivity control" Journal of Applied Physics, American Institute of Physics. New York, US, vol. 91, No. 3, Feb. 1, 2002, pp. 1589-1594.*

Pages H et al.: "Wide band electrochromic displays based on thin conducting polymer films" Electrochimica Acta, Elsevier Science Publishers, Barking, GB, vol. 46, No. 13-14, Apr. 2, 2001, pp. 2137-2143.*

(Continued)

*Primary Examiner*—Dah-Wei D Yuan
*Assistant Examiner*—Amanda Barrow
(74) *Attorney, Agent, or Firm*—Nixon Peabody LLP

(57) ABSTRACT

The invention concerns an electrochromic cell with emission controlled by electrodeposition under the action of a control voltage. The cell comprises the following flexible elements, superimposed and respectively in intimate contact:
  a first electrode (11) intended to be connected to a first potential of the control voltage,
  a first porous layer (12), formed of a mixture of PVDF-HFP, PEO and an activated carbon powder,
  a porous separator (13), formed of a mixture of PVDF-HFP and PEO,
  a second electrode (14) formed of a grid and connected to a second potential of the control voltage,
  a second porous layer (15), formed of a mixture of PVDF-HFP, PEO and carbon powder,
an aqueous electrolytic solution containing a copper salt being contained in the first flexible layer (12), in the separator (13) and in the second flexible layer (15).

6 Claims, 2 Drawing Sheets

OTHER PUBLICATIONS

International Search Report, FA 660205 and FR 0453112, 2 pgs, (Jun. 21, 2005).

Bessiere, A. et al., "Flexible ElectrochromicReflectance Device Based On Tungsten Oxide For Infrared Emissivity Control", Journal of Applied Physics, American Institute of Physics, New York, US, vol. 91, No. 3, (Feb. 1, 2001), pp. 1589-1594, XP012055677, ISSN: 0021-8979, p. 1589-p. 1592, Fig 1.

Bessiere, A. et al., "Control Of Powder Microstructure For Improved Infrared Reflectance Modulation Of An Electrochromic Plastic Device", Chem. Mater., vol. 15, No. 13, (May 30, 2003), XP002332809, USA, p. 2577-p. 2579, Fig 1.

Chandrasekhar, Prasanna et al., "Large, Switchable Electrochromism In The Visible Through Far-Infrared In Conducting Polymer Devices", Advanced Functional Materials, Wiley Intersciences, Wienheim, DE, vol. 12, No. 2, (Feb. 2002), pp. 95-103, XP001123864, ISSN: 1616-301X, p. 95-p. 97, Fig. 1.

Pages, H. et al., "Wide Band Electrochromic Displays Based On Thin Conducting Polymer Films", Electrochimica ACTA, Elsevier Science Publishers, Barking, GB, vol. 46, No. 13-14, (Feb. 4, 2001), pp. 2137-2143, XP004233995, ISSN: 0013-4686, p. 2137-p. 2139, Fig. 1.

\* cited by examiner

ELECTROCHEMICAL CELL WITH EMISSION CONTROLLED BY ELECTRODEPOSITION OF COPPER

CROSS REFERENCE TO RELATED APPLICATIONS OR PRIORITY CLAIM

This application is a national phase of International Application No. PCT/FR2005/051104 entitled "Electrochemical Cell With Optical Absorption And Reflection Controlled By Copper Electroplating", which was filed on Dec. 19, 2005, which was not published in English, and which claims priority of the French Patent Application Nos. 04 53112 filed Dec. 21, 2004.

TECHNICAL FIELD

The invention concerns an electrochemical cell with controlled emission in the visible and the infrared.

STATE OF THE PRIOR ART

The document "Reversible Electrochemical Mirror (REM) Smart Window" by D. M. TENCH et al., Proceedings of International Symposium, Electrochromic Materials and Applications, Volume 2003-17, page 190, published following a lecture given on the $1^{st}$ May 2003, discloses a device for controlling the absorption and the emission of light in the visible that operates by means of a reversible electrodeposition of silver. The device comprises, in superimposition, a first glass plate, a counter electrode in the form of a grid, a layer of electrolyte in gammabutyrolactone containing electrodepositable silver ions, a mirror electrode in mixed indium and tin oxide (ITO) and a second glass plate that is not transparent in the infrared. To increase the reflectivity of the device, a voltage is applied to it in order to electrodeposit silver on the surface of the mirror electrode in contact with the electrolyte. Once the voltage is cut, the device remains in the same state: there is no need to maintain a voltage to keep a high reflectivity. To reduce the reflectivity, the polarity of the voltage is inversed in order to dissolve the silver deposited on the surface of the mirror electrode. Silver is then deposited on the counter electrode in the form of a grid.

This prior art device has the disadvantage of being a rigid device and being totally absorbent in the infrared.

Moreover, U.S. Pat. No. 5,296,318 discloses a rechargeable battery comprising composite electrodes and using lithium as insertion ions. This battery uses different powders that are incorporated in a polymer matrix that is in the form of a film. This structure procures two advantages. Firstly, it confers a mechanical strength to the powder. Secondly, the films formed from different components of a battery may be laminated together with current collectors in the form of a grid so as to form an entirely flexible cell.

The cells developed by this technique of the prior art use a hydrophobic copolymer type polymer of vinylidene fluoride and hexafluoropropylene (PVDF-HFP) at a rate of 12% by weight. They therefore employ organic type solvents such as dimethylcarbonate, propylene carbonate, ethylene carbonate or acetonitrile. These cells have the disadvantage of having to be assembled in glove boxes.

DESCRIPTION OF THE INVENTION

The invention proposes an electrochromic cell with controlled emission in the visible and the infrared and that has the important characteristic of being flexible and operating in aqueous medium.

The interest of an aqueous medium it that it enables a higher ionic exchange thanks to higher ionic conductivities due to the fact of the high dissociation constant of water. As other advantages of water, one may note its transparency in the infrared and the respect of the environment. The formation of an aqueous cell involves finding a suitable polymer and implementing said polymer.

The subject of the invention is therefore an electrochromic cell with emission controlled by electrodeposition under the action of a control voltage, characterised in that it comprises the following flexible elements, superimposed and respectively in intimate contact:

a first electrode, intended to be connected to a first potential of the control voltage, a first porous layer, formed of a mixture of PVDF-HFP, PEO and an activated carbon powder, a porous separator, formed of a mixture of PVDF-HFP and PEO, a second electrode formed of a grid and connected to a second potential of the control voltage, a second porous layer formed of a mixture of PVDF-HFP, PEO and carbon powder, an aqueous electrolytic solution containing a copper salt being contained in the first flexible layer, in the separator and in the second flexible layer.

The first electrode may be formed of a metallic leaf (for example in stainless steel) or by a metallic grid (for example in copper).

The second electrode may be a grid in copper or in stainless steel.

The copper salt of the electrolytic solution may be copper sulphate or other copper salts.

BRIEF DESCRIPTION OF DRAWINGS

The invention will be more fully understood and other advantages and specific features will become clear on reading the description that follows, given by way of example and in nowise limitative, along with the appended drawings among which.

DETAILED DESCRIPTION OF SPECIFIC EMBODIMENTS

As has been stated above, the PVDF-HFP copolymer is hydrophobic. However, this copolymer is very interesting due to its remarkable mechanical properties. In order for this polymer to be able to absorb water, it is here proposed to add to it a hydrophilic polymer. On proposes polyethylene oxide (PEO), which is very hydrophilic.

It firstly involves finding the right composition for the mixture of PVDF-HFP and PEO, in other words a composition for which the mixture absorbs a large quantity of water while maintaining an adequate mechanical strength.

Figure 1:
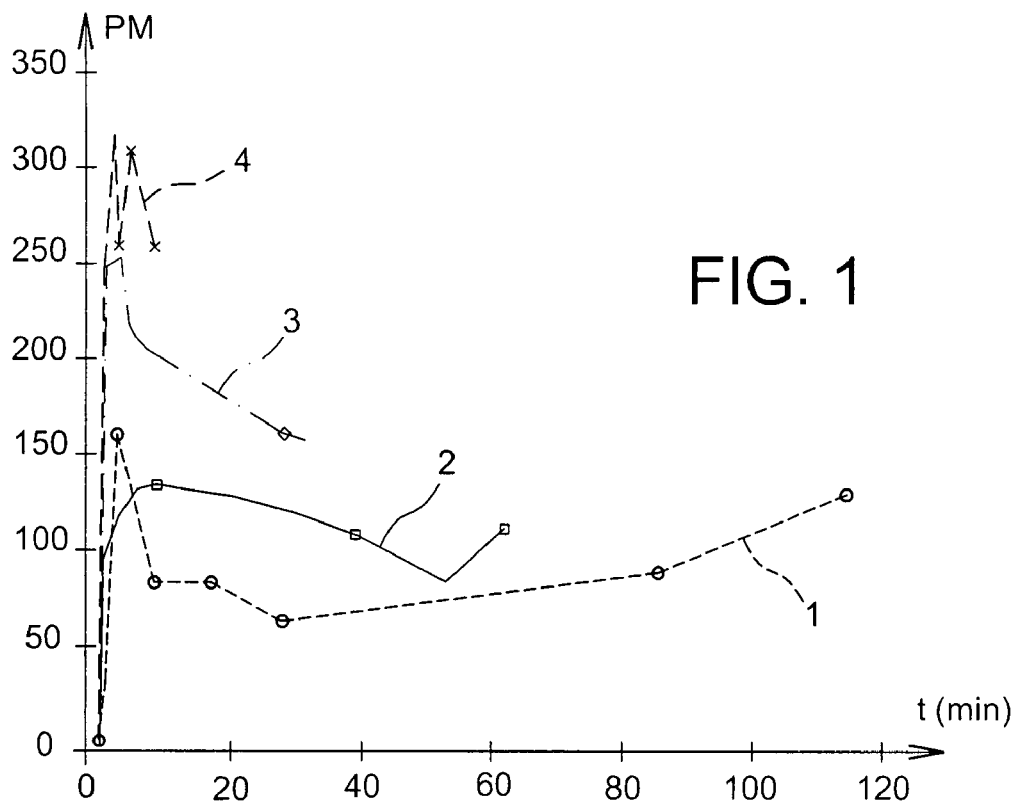
FIG. 1 is a diagram representing weight gain curves for different copolymers used to form the electrochemical cell according to the invention.

FIG. 1 is a diagram representing weight gain (WG) curves in % for different mixtures of PVDF-HFP and PEO as a function of the absorption time t in minutes. The PVDF-HFP copolymer used comprises 12% molar HFP. Curve 1 corresponds to a PVDF-HFP copolymer (therefore without PEO). Curve 2 corresponds to a mixture comprising 80% by weight of PVDF-HFP and 20% by weight of PEO. Curve 3 corresponds to a mixture comprising 60% by weight of PVDF-HFP and 40% by weight of PEO. Curve 4 corresponds to a mixture comprising 50% by weight of PVDF-HFP and 50% by weight of PEO.

The bell shape of the curves shows that the PEO dissolves in water. It is the PVDF-HFP that assures the mechanical strength. Compositions greater than 50% by weight of PEO have been tested. They do not have sufficient mechanical strength. However, the addition of a silica filler should enable the percentage of PEO to be further increased.

Electrical conductivity tests with a solution of sulphuric acid have been carried out. The results show that from the incorporation of 30% of PEO, the conductivities obtained are greater than those of non aqueous batteries, namely $1.61 \cdot 10^{-4}$ $S.cm^{-1}$. A very high performance electrolyte is thereby obtained simply.

Films of PVDF-HFP and PEO mixture may be formed with laboratory material. For a film of 50% by weight of PEO, 1 g of PEO is introduced into a pill making machine and dispersed in 1 mL of ether before adding acetonitrile up to the halfway mark of the flask. The stoppered flask is then agitated until the PEO is well solvated. Then, 1 g of PVDF-HFP comprising 12% molar HFP, 2 g of di-n butyl phthalate (DBP) that acts as plastifier and acetone are added. The solution is then mixed for 15 minutes at an approximate rate of 2000 rpm before being spread out on a glass plate by means of a doctor blade enabling the thickness of the deposit to be controlled. After evaporation of the solvents, one obtains films in the form of ribbons 5 cm wide and around 1.2 m long.

Figure 2:
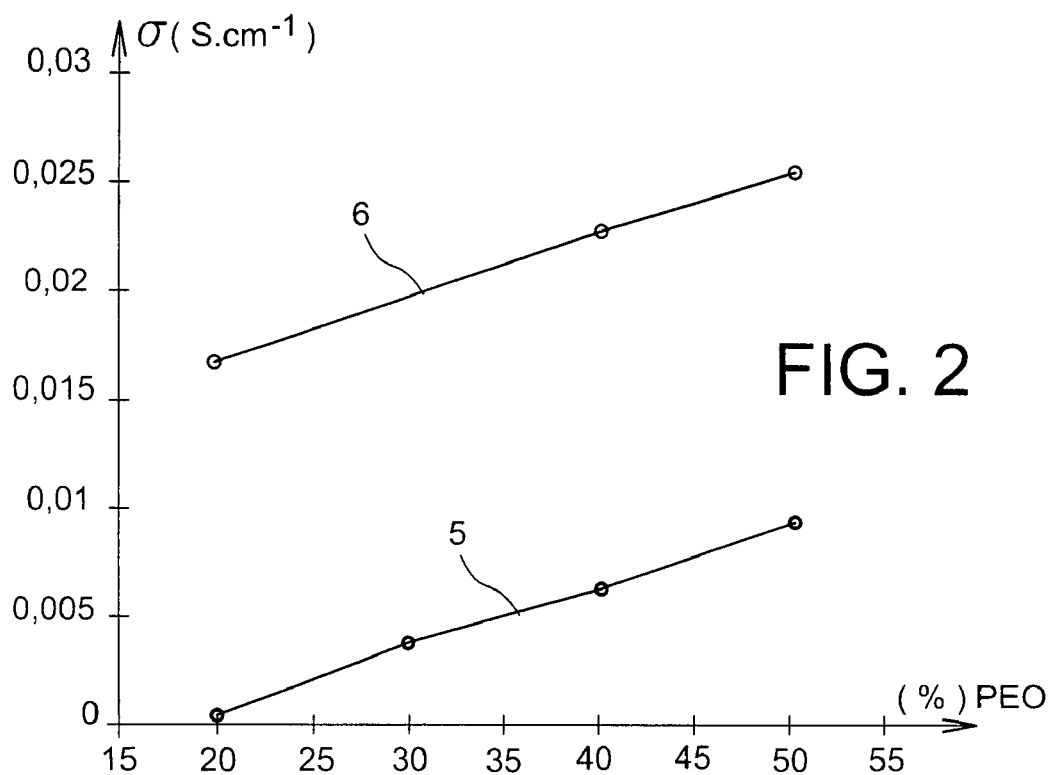
FIG. 2 is a diagram representing the electrical conductivity as a function of the concentration in sulphuric acid for the copolymers used to form the electrochemical cell according to the invention.

FIG. 2 is a diagram representing the electrical conductivity for different concentrations of $H_2SO_4$ and different concentrations by weight of PEO in the PVDF-HFP and PEO mixture. Curve 5 has been traced for a concentration of $H_2SO_4$ equal to 1 M. Curve 6 has been traced for a concentration of $H_2SO_4$ equal to 0.1 M.

Plastic films of PVDF-HFP and PEO mixture comprising active materials may be formed in the same way, but by adding at the end of manufacture the active materials in the form of powder. An active material/polymer ratio equal to 3.66 (mass ratio) has been used. One may also use a higher quantity of active material.

Figure 3:
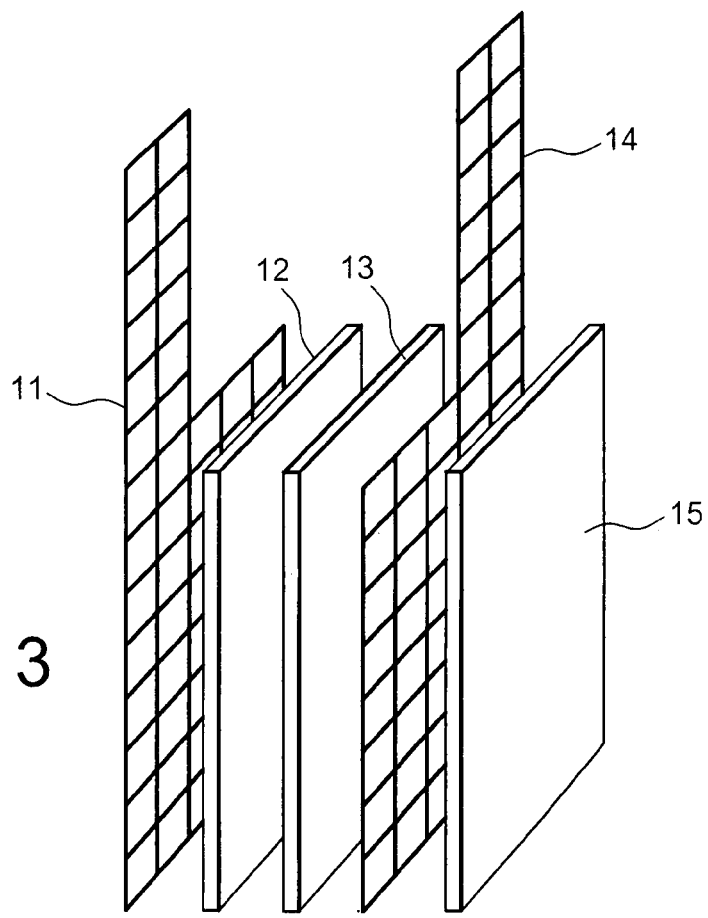
FIG. 3 represents an electrochemical cell with emission controlled by electrodeposition of copper, according to the present invention.

FIG. 3 represents an electrochemical cell with emission controlled by electrodeposition of copper, according to the present invention. The cell comprises the stacking of flexible layers formed of a copper grid 11, a layer 12 formed of a mixture of activated carbon, PVDF-HFP and PEO, a separator 13 formed of a mixture of PVDF-HFP and PEO, an electrode 14 formed of a grid in copper or in stainless steel, and a layer 15 formed of a mixture of PVDF-HFP, PEO and a carbon powder.

The grids 11 and 14 may comprise meshes of around 0.5 mm. The separator 13 may be formed of a mixture comprising 50% by weight of PVDF-HFP (12% molar HFP) and 40% by weight of PEO.

The films 12, 13 and 15 in PVDF-HFP and PEO mixture have been rendered porous by removal of the DBP used to form them. This removal may be obtained by placing the assembled cell in ether. The cell comprising the films rendered porous may then be filled with aqueous electrolyte by immersing it in a vessel containing this electrolyte.

The thickness of the layer 12 may be from 10 to 100 μm. The thickness of the separator 13 may be between 10 μm and 100 μm. The thickness of the layer 15 may be between 10 and 100 μm.

The layers 11, 12 and 13 form a half-cell that is going to be tested in a vessel into which is poured a solution that seeps into the pores of the layers 12 and 13 in mixture of PVDF-HFP and PEO. The solution is formed of 0.5 M of $CuSO_4.5H_2O$ in 1 M of $H_2SO_4$.

Figure 4:
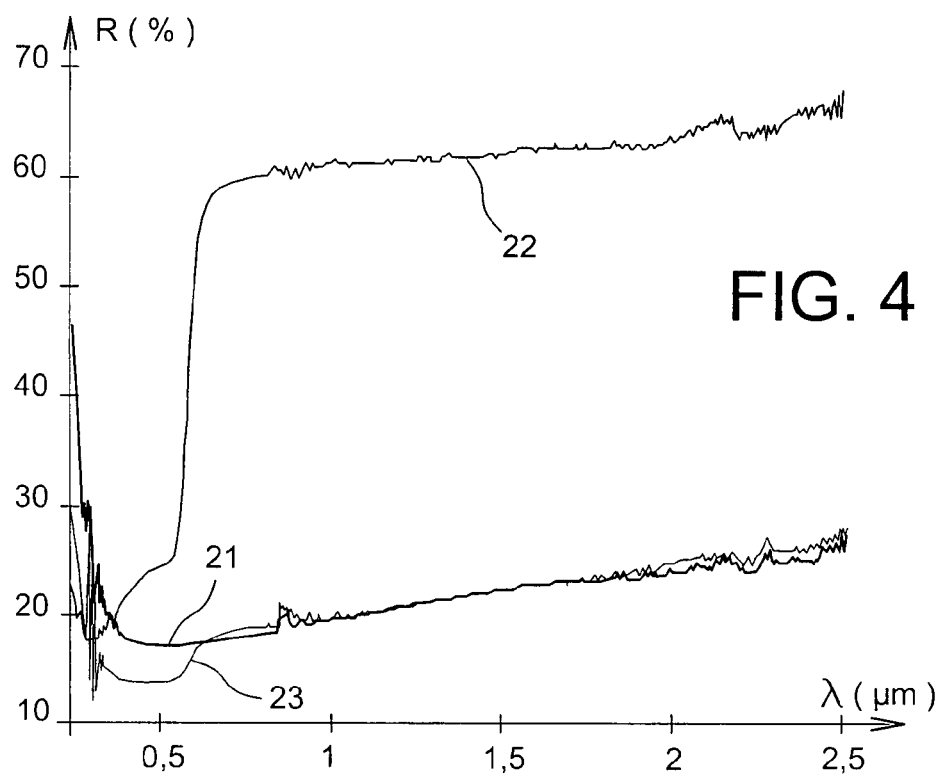
FIG. 4 represents a reflection spectrum obtained for the electrochemical cell according to the invention.

FIG. 4 represents a reflection spectrum obtained for the electrochemical cell described previously. The Y-axis represents the reflection R and the X-axis represents the wavelength λ of a light incident to the cell, on the side of the electrode 14.

The electrochemical cell is supplied, between the electrode 11 and the electrode 14, by a continuous control voltage or by a current. Curve 21 is representative of the initial state of the cell. A light incident to the layer 15 is reflected at a level of around 20%. Under the effect of a control current of 0.2 A, a deposit of copper forms on the grains of carbon of the layer 15. A deposit of copper is formed there at a rate of 3 coulombs per $cm^2$ in 1 minute. In this state, a light incident to the layer 15 is reflected at a level of around 60%. This is shown by curve 22. Under the effect of another control voltage, opposite to the previous one, the copper dissolves. In this state, a light incident to the layer 15 is reflected at a level of around 20%. The cell therefore has a contrast of 40%.

The double advantage of the cell according to the invention is to have a high contrast in a short time (around 1 minute).

The invention claimed is:

1. Electrochromic cell with absorption and emission of light controlled by electrodeposition under the action of a control voltage, comprising the following flexible elements, superimposed and respectively in intimate contact:
    a first electrode intended to be connected to a first potential of the control voltage,
    a first porous layer, formed of a mixture of polyvinylidene difluoride hexafluoropropylene (PVDF-HFP), polyethylene oxide (PEO) and an activated carbon powder,
    a porous separator, formed of a mixture of PVDF-HFP and PEO,
    a second electrode formed of a grid and connected to a second potential of the control voltage,
    a second porous layer, formed of a mixture of PVDF-HFP, PEO and carbon powder,
    an aqueous electrolytic solution containing a copper salt being contained in the first porous layer, in the separator and in the second porous layer.

2. Electrochemical cell according to claim 1, wherein the first electrode is formed of a metallic leaf or by a metallic grid.

3. Electrochemical cell according to claim 2, wherein the first electrode is formed of a stainless steel leaf.

4. Electrochemical cell according to claim 2, wherein the first electrode is formed of a copper grid.

5. Electrochemical cell according to claim 1, wherein the second electrode is a grid in copper or in stainless steel.

6. Electrochemical cell according to claim 1, wherein the copper salt of the electrolytic solution is copper sulphate.

* * * * *